Nov. 7, 1939.　　C. B. MARVIN ET AL　　2,178,877
WELDING MACHINE
Filed Sept. 4, 1937　　2 Sheets-Sheet 2
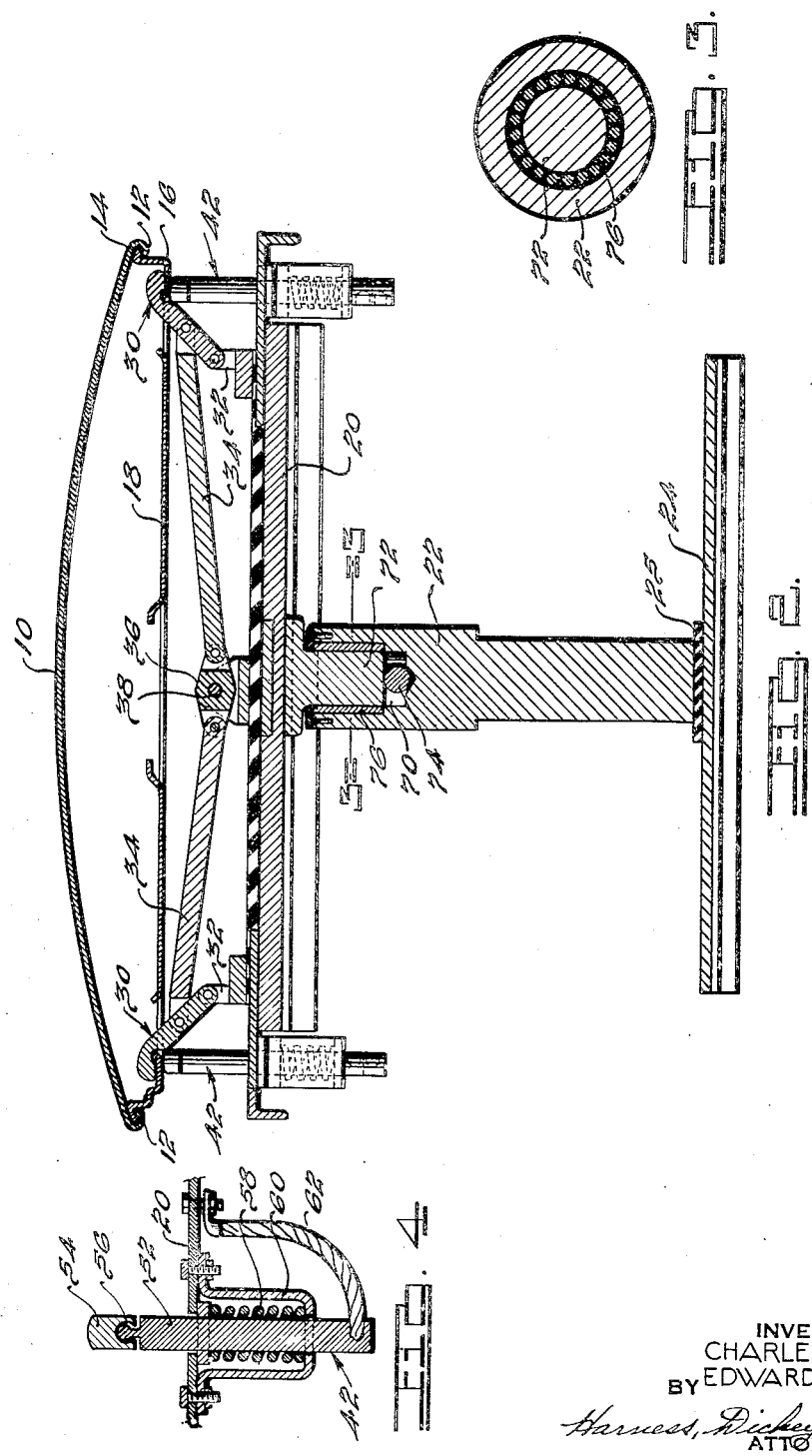
INVENTOR
CHARLES B. MARVIN
BY EDWARD J. PODANY
ATTORNEYS.

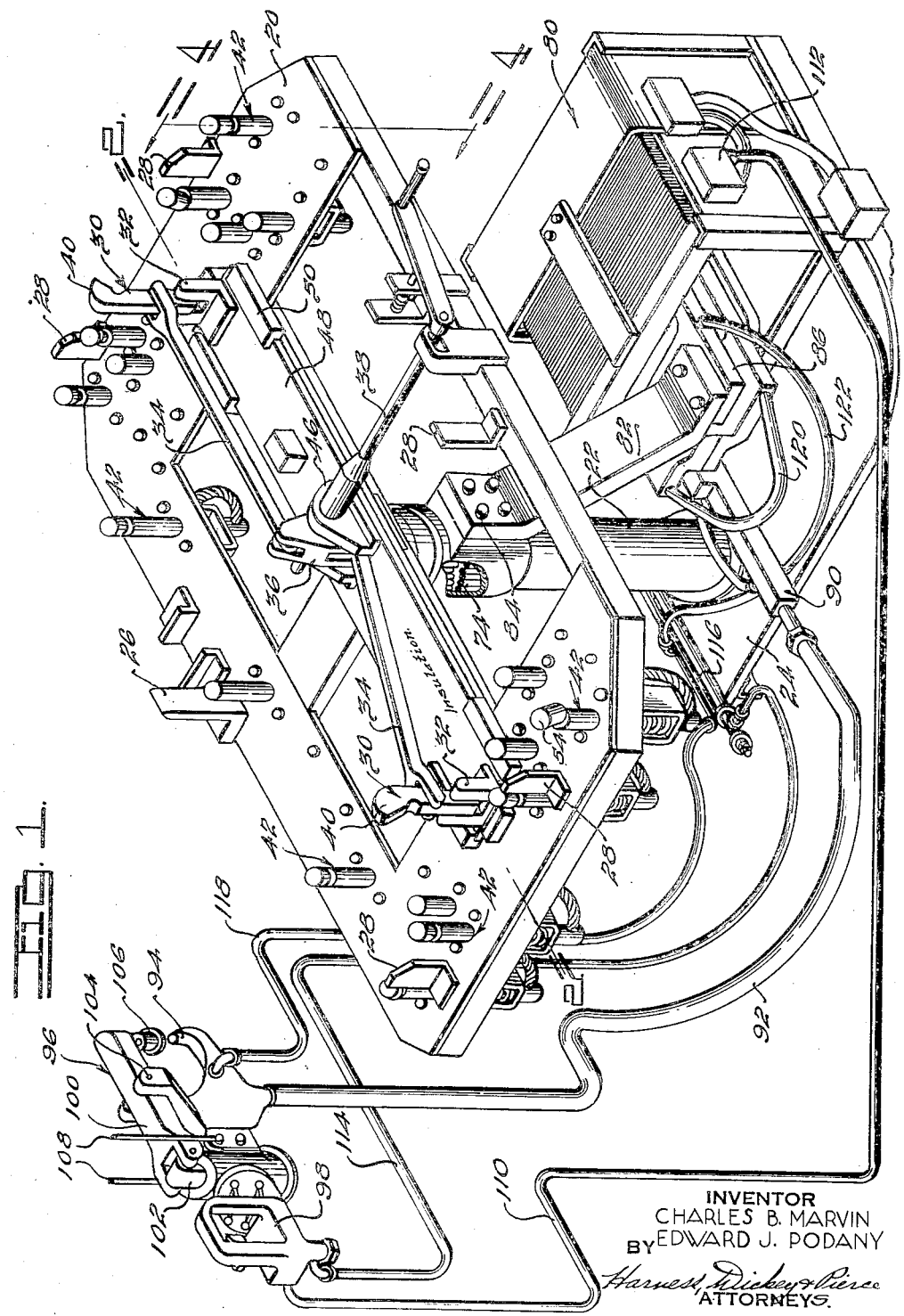
Nov. 7, 1939. C. B. MARVIN ET AL 2,178,877
WELDING MACHINE
Filed Sept. 4, 1937   2 Sheets-Sheet 1
INVENTOR
CHARLES B. MARVIN
EDWARD J. PODANY
BY
Harness, Dickey & Pierce
ATTORNEYS.

Patented Nov. 7, 1939

2,178,877

UNITED STATES PATENT OFFICE 2,178,877

WELDING MACHINE

Charles B. Marvin and Edward J. Podany, Detroit, Mich., assignors to The Murray Corporation of America, Detroit, Mich., a corporation of Delaware Application September 4, 1937, Serial No. 162,442

2 Claims. (Cl. 219—4)

The present invention relates to method of and means for electric welding, and in particular provides an extremely simple and effective method of and means for positioning a work piece in welding position and for effecting a welding operation on the work piece while so positioned.

Principal objects of the invention are to provide an improved method of welding, utilizing an improved work supporting fixture; to provide such a method in which the work supporting fixture carries one or more electrodes in position to be engaged by a work piece supported on the fixture; and to provide such a method in which an electrode complemental to each fixture electrode may be embodied in a portable welding gun.

Further objects of the invention are to provide an improved fixture for supporting a work piece to be welded, characterized as embodying one or more electrodes disposed to engage the work, and embodying means to clamp the work into engagement with the electrodes; to provide such a structure embodying a supporting base and a work supporting table portion, which is rotatable upon the base; to provide such a structure in which the supporting connection between the table portion and the standard forms a part of the conducting path leading to the electrode means; and to provide such a structure in which the electrodes are resiliently adjustable upon the table portion so as to accommodate themselves to work pieces of different forms.

Further objects of the present invention are to provide a structure particularly adapted for practicing the so-called indirect method of welding, in which the electrode or electrodes electrically connected to one terminal of the supply source are carried by the work supporting fixture, and the electrode or electrodes associated with the other terminal of the supply source may be embodied in a portable welding gun.

With the above as well as other objects in view, which appear in the following description and in the appended claims, a preferred but illustrative embodiment of the invention is shown in the accompanying drawings, throughout which corresponding reference characters are used to designate corresponding parts and in which:

Figure 1 is a view in perspective of a preferred embodiment of the invention;

Fig. 2 is a view in vertical section, taken along the line 2—2 of Fig. 1, with the clamping means in work-holding position, and showing an illustrative work piece in place;

Fig. 3 is a view in horizontal section, taken along the line 3—3 of Fig. 2; and

Fig. 4 is a view in vertical section, taken along the line 4—4 of Fig. 1.

It will be appreciated from a complete understanding of the invention, that the improvements thereof may be utilized to perform welding operations upon a wide variety of types of work pieces. The illustrated fixture, however, is designed particularly for welding together the inner and outer panels of automobile doors. Accordingly, to assist in a ready understanding of the illustrated embodiment, the just mentioned elements of a door are illustrated in Fig. 2, as comprising the generally arcuately formed outer panel 10, the marginal edge 12 of which is reversely turned to form a channel to receive the lip 14 formed on the door rail portion 16 of the inner panel 18. It will be understood that the desired operation consists in forming a weld between the marginal edge 12, the lip 14 and the rail 16, so as to rigidly and permanently secure the inner and outer panels 10 and 18 together.

The work supporting fixture is illustrated as comprising generally a supporting table portion 20, which is rotatably supported on a vertical standard 22, which in turn is carried by the base 24. The form of the table portion 20 of course depends upon the character of the work pieces with which it is to be associated and, in the illustrated instance, to accommodate it to the previously described door, the portion 20 is of generally rectangular form.

In order to position the work piece upon the table portion 20, as well as to secure it in place thereon, the table portion 20 is provided with a plurality of work guides or jigs 26 and 28, the number and spacing between which is so proportioned as to afford a stable support for the work. In addition, the table portion 20 is provided with a pair of clamping levers 30, which are rotatably supported within clevises 32, and are arranged to be actuated from the retracted position as shown in Fig. 1 to the work-engaging position as shown in Fig. 2 by associated levers 34. The levers 34 are connected to a centrally disposed bellcrank member 36, which is connected to a suitable crank 38 or equivalent operating means.

The outer ends 40 of the clamping members 30 are of generally hook-like form and are adapted to engage over the inner marginal edge of the inner panel 18, as clearly appears in Fig. 2. When so positioned, the clamps 30 securely hold the inner panel 18 in conducting engagement with the series of electrodes 42, which are carried by the table portion 20 and are described in more detail below.

It is preferred to form the entire table portion 20 of conducting material so as to facilitate the leading of current to the various electrodes 42. With this relation, it is preferred to fully insulate the work-positioning and clamping structure from the table portion 20. Accordingly, the previously mentioned jigs or guides 26 and 28 are preferably insulated from the table portion 20. Also, the clevises 32, as well as the clevis 46 which supports the bellcrank 36, are carried upon a transverse member 48 which is formed of insulating material.

Each of the electrodes 42 comprises a conducting body portion 52 having a conducting head thereon which is adjustably connected to the body as by means of the illustrated ball and socket joint 56. Each body portion 52 projects through an opening provided therefor in the table portion 20 and is urged to the upper position illustrated in Figs. 2 and 4 by a compression spring 58 which surrounds the body portion. One end of each compression spring 58 seats against a washer or equivalent member secured to the body portion 52, and the other end thereof seats against the base of a guide member 60. Each spring 58 is thus effective to resiliently urge the associated electrode 42 to the upper limit position thereof, but permits such electrode to be forced downwardly to accommodate itself to the work. Adjustable heads 54 serve to further accommodate the electrodes to differing detailed constructions of work pieces. Each electrode 42 is connected to the portion 20 by a flexible lead 62.

An important feature of the present construction resides in constructing the table portion 20 so that it is rotatably adjustable relative to the supporting standard 22, and in also constructing the bearing elements between the table portion 20 and the standard 22 in such a way so as to form a conducting path for the current which passes through the electrodes 42. In this way, any otherwise necessary complicated flexible connecting or slip-ring arrangements may be entirely dispensed with.

As best shown in Fig. 2, the upper end of the standard 22 is provided with a counterbore 70, which rotatably receives a trunnion 72 which is secured to and extends downwardly from the center of the table porton 20. A ball 74 or equivalent bearing element is interposed between the end of the trunnion 72 and the base of the counterbore 70, so as to provide an effective thrust bearing for the table portion 20. In addition, it is preferred to interpose a plurality of roller elements 76 between the trunnion 72 and the counterbore 70. Preferably also, the rollers 76 are packed with a conducting lubricant such as graphite. The standard 22, trunnion 72 and table portion 20 are all preferably formed of conducting material, so that it will be appreciated that a direct conducting path is afforded between the standard 22 and each of the electrodes 42.

A direct connection is afforded between the standard 22 and a conventional supply transformer 80, by a bus-bar 82, one end of which is connected to the standard 22 as by the studs 84 and the other end of which may be correspondingly connected to the secondary winding 86 of the transformer. The transformer 80 may be and preferably is supported upon the previously mentioned base 24, and the other terminal 90 of the secondary winding thereof is connected, through a conventional flexible cable 92, to the electrode 94 of a suitable portable welding gun 96.

As illustrated, the gun 96 comprises the electrode 94, a handle grip portion 98, a clamping member 100, and a fluid operated plunger mechanism 102 for actuating the clamping member 100 about its pivot pin 104, so as to clamp the work between the electrode 94 and an insulating pad 106 carried by the member 100. As illustrated also, the gun is provided with cables 108 or equivalent means which support it at a freely adjustable elevation and which permit it to be moved to any desired position with respect to the table portion 20. In accordance with the arrangement disclosed in Patent No. 1,983,692, granted to Calley on December 11, 1934, and assigned to the assignee of the present application, the gun 96 preferably embodies mechanism to prevent completion of the primary circuit of the transformer 80 except at such times as the work is securely clamped between the electrode 94 and the pad 106. For this purpose, a control connection is preferably carried in a flexible cable 110 from the gun 96 to a control switch 112 supported at the side of the transformer 80. The connections for the switch 112, as well as the mechanism within the gun 96 for controlling it, are not shown, but it will be appreciated that actuation of the fluid plunger mechanism 102 to force the pad 106 into clamping relation to the work also closes suitable contacts in the gun to actuate the switch 112 to its closed position. The switch 112 in turn may readily be connected to open and close the primary circuit of the transformer 80. Preferably also and as illustrated, a suitable air or equivalent fluid control line 114 extends from the plunger mechanism 102 to a suitable source of supply as indicated at 116.

Preferably also and as illustrated, means are provided to cool the electrode 94, as well as to cool the secondary winding of the transformer 80. This cooling means is illustrated as a conduit 118, and associated conduits 120 and 122 which may be of the conventional concentric type embodying inner and outer concentrically-related supply and return lines.

Considering the operation of the device as a whole, it will be appreciated that the parts are shown in Fig. 1 with the transformer 80 in a deenergized condition, with the gun 96 in a released position, and with the clamping members 30 in retracted position. In practicing the invention, a work piece such as the previously mentioned automobile door may be placed over the table 20 and positioned thereon by the guides or jigs 26 and 28, which serve to prevent lateral or transverse movement of the work piece relative to the table portion 20. Thereafter, the crank 38 may be actuated to project the clamp 30 to the locking position as shown in Fig. 2, in which they are effective to force the work piece downwardly upon, and in conducting relation to, the electrodes 42. Depending upon the configuration of the inner panel 18, the electrodes may thus be forced downwardly relative to the table portion 20 by differing amounts, and also, the heads 54 of the electrodes may be caused to move to offset positions with respect to the body portion 52 thereof. It will be noted that in the adjusted position of the work piece, the electrodes 42 engage the inner panel 18 adjacent the outer marginal edge thereof.

After securing the work piece upon the table portion 20, the gun 96 may be manually moved to bring the electrode 94 into engagement with the underside of the marginal edge 12 of the outer panel 10, and to bring the cooperating pad 106 into engagement with the outer surface of the panel 10. Thereafter, the usual trigger mechanism associated with the gun 96 may be actuated to cause the plunger 102 to force the pad 106 securely into engagement with the outer face of the panel 10, clamping the electrode 94 into engagement with the inner portion of the marginal edge 12. As previously mentioned, the clamping action also actuates the switch 112 associated with the transformer 80, connecting the primary winding of the latter to a suitable source of supply not shown. This action causes current to flow in the secondary winding through a circuit which includes the bus-bar 82, standard 22, rollers 74, trunnion 72, table portion 20, a flexible connector 62 associated with an electrode 42 which is near the position of the electrode 94, and thence through a portion of the inner panel 18, and a portion of the outer panel 10 to the electrode 94. The return circuit from the electrode 94 is provided through the previously mentioned flexible cable 92. The just mentioned secondary current effects the usual welding action between the inner panel 18 and the outer panel 20. It will be appreciated that, since all of the electrodes 42 are electrically connected to the table 20, and consequently are electrically connected to the cooperating gun electrode 94 when the latter is clamped to the work, it may be considered that welding current flows through each of the fixed electrodes 42 at each position of the gun. The current path of least resistance, however, extends from the electrode 94 to the nearest fixed electrode 42 so that for practical purposes each positioning of the gun forms one weld corresponding to the nearest fixed electrode 42. Following each such welding operation, the gun 96 may be released and removed to a position adjacent another of the stationary electrodes 42 and a welding operation again effected in the just described manner. At the completion of the welding operation, the work piece may readily be removed from the fixture by releasing the clamps 30 out of engagement with the inner panel 18.

Although a specific embodiment of the invention as well as a specific method of practicing it have been disclosed in detail, it will be appreciated that various changes in the method, as well as various modifications in the form, number and arrangement of the parts, may be made within the spirit and scope of the invention.

What is claimed is:

1. In a device of the class described, the combination of a work table of conducting character, means carried by said table but insulated therefrom for positioning and securing a work piece thereon, and one or more electrodes carried by and electrically connected to said work table for engaging a work piece when so positioned.

2. In a device of the class described, the combination of a work table formed of conducting material, means carried by said table but insulated therefrom for positioning and securing a work piece thereon, one or more electrodes carried by said table and disposed to yieldingly engage said work piece, means for supporting said table for rotation about a substantially vertical axis, and means including a portable electrode element movable to engage any of a plurality of selected points on the work piece when the work piece is supported on the work table.

CHARLES B. MARVIN.
EDWARD J. PODANY.